(12) United States Patent
Blomstedt et al.

(10) Patent No.: US 11,846,787 B2
(45) Date of Patent: Dec. 19, 2023

(54) DIFFRACTIVE WAVEGUIDE ELEMENT AND DIFFRACTIVE WAVEGUIDE DISPLAY

(71) Applicant: DISPELIX OY, Espoo (FI)

(72) Inventors: Kasimir Blomstedt, Espoo (FI); Juuso Olkkonen, Espoo (FI); Antti Sunnari, Espoo (FI)

(73) Assignee: DISPELIX OY, Espoo (FI)

(*) Notice: Subject to any disclaimer, the term of this patent is extended or adjusted under 35 U.S.C. 154(b) by 542 days.

(21) Appl. No.: 16/954,932

(22) PCT Filed: Dec. 11, 2018

(86) PCT No.: PCT/FI2018/050905
§ 371 (c)(1),
(2) Date: Jun. 17, 2020

(87) PCT Pub. No.: WO2019/122508
PCT Pub. Date: Jun. 27, 2019

(65) Prior Publication Data
US 2020/0333615 A1    Oct. 22, 2020

(30) Foreign Application Priority Data
Dec. 22, 2017 (FI) ...................................... 20176161

(51) Int. Cl.
*G02B 27/42* (2006.01)
*G02B 5/08* (2006.01)
(Continued)

(52) U.S. Cl.
CPC ....... *G02B 27/4272* (2013.01); *G02B 5/1828* (2013.01); *G02B 6/0016* (2013.01); *G02B 27/0081* (2013.01); *G02B 27/0172* (2013.01)

(58) Field of Classification Search
CPC .............. G02B 27/4272; G02B 5/1828; G02B 6/0016; G02B 27/0081; G02B 27/0172;
(Continued)

(56) References Cited

U.S. PATENT DOCUMENTS

2008/0285137 A1    11/2008  Simmonds et al.
2009/0015929 A1*    1/2009  DeJong .............. G02B 27/0081
                                                         359/636
(Continued)

FOREIGN PATENT DOCUMENTS

WO    20090009268 A1    1/2009
WO     2009101238 A1    8/2009
(Continued)

OTHER PUBLICATIONS

FI Search Report in Application No. 20176161 dated Aug. 16, 2018.
(Continued)

*Primary Examiner* — Kimberly N. Kakalec
(74) *Attorney, Agent, or Firm* — Maschoff Brennan

(57) ABSTRACT

A diffractive waveguide element for a personal display device includes a display waveguide extending in a waveguide plane, an in-coupling diffractive optical element arranged onto or into the display waveguide for diffractively coupling light rays into the display waveguide, and an out-coupling diffractive optical element arranged onto or into the display waveguide for coupling the diffractively coupled light rays out of the display waveguide. In addition, there is provided a ray multiplier element optically upstream of the out-coupling diffractive optical element, the ray multiplier element being capable of splitting a light ray incoming to the in-coupling grating into a plurality of parallel rays spatially displaced in the waveguide plane before they enter the out-coupling diffractive optical element. A waveguide display device is also provided.

11 Claims, 3 Drawing Sheets

(51) Int. Cl.
  *F21V 8/00* (2006.01)
  *G02B 27/00* (2006.01)
  *G02B 27/01* (2006.01)
  *G02B 5/18* (2006.01)

(58) Field of Classification Search
  CPC ............... G02B 6/0028; G02B 6/0043; G02B 27/0101; G02B 27/01; G02B 5/00; G02B 5/1814; G02B 6/00; G02B 6/10; G02B 27/00; G02B 27/0103; G02B 27/017
  See application file for complete search history.

(56) References Cited

U.S. PATENT DOCUMENTS

| | | |
|---|---|---|
| 2010/0321781 A1 | 12/2010 | Levola et al. |
| 2012/0176682 A1 | 7/2012 | DeJong |
| 2012/0281721 A1 | 11/2012 | DeJong et al. |
| 2013/0346490 A1 | 12/2013 | Subramanian et al. |
| 2015/0086163 A1* | 3/2015 | Valera ................. G02B 6/34 427/163.2 |
| 2016/0291328 A1 | 10/2016 | Popovich et al. |
| 2017/0075119 A1* | 3/2017 | Schultz ............. G02B 27/0172 |
| 2017/0131551 A1 | 5/2017 | Robbins et al. |

FOREIGN PATENT DOCUMENTS

| | | |
|---|---|---|
| WO | 2014080155 A1 | 5/2014 |
| WO | 2016141372 A1 | 9/2016 |
| WO | 2017207987 A1 | 12/2017 |

OTHER PUBLICATIONS

CN Office Action in Application No. 20180082846.0 dated Aug. 31, 2021.

EP Search Report in Application No. 18891531.8 dated Jul. 5, 2021.

* cited by examiner

DIFFRACTIVE WAVEGUIDE ELEMENT AND DIFFRACTIVE WAVEGUIDE DISPLAY

FIELD OF THE INVENTION

The invention relates to diffractive waveguides. Such waveguides can be used in personal display devices, such as head-mounted displays (HMDs) and head-up displays (HUDs).

BACKGROUND OF THE INVENTION

Waveguides are key image-forming elements in many modern personal display devices. The image to be displayed can be coupled into and out of the waveguide, as well as modified within the waveguide, using diffractive gratings. For example, there may be provided an in-coupling grating for coupling an image from a projector into the waveguide, an exit pupil expander grating for expanding the light field in one or more in-plane dimensions of the waveguide, and an out-coupling grating which couples the image of the waveguide to the user's eye.

One problem related to diffractive waveguide elements is striping of the image out-coupled therefrom. This is because the light beams travelling in the waveguide via total internal reflections may have a bouncing period, i.e. hop length, longer than the diameter of the eye pupil of the viewer. In this case, a pixel may be diffracted beside the pupil and be therefore not visible for the user. This effect is noticeable in particular with high angles of incidence (with respect to the normal of the waveguide) and when laser projector is used for image formation, since each image pixel is composed of a narrow beam only.

SUMMARY OF THE INVENTION

It is an aim of the invention to solve the abovementioned problem and to provide solution that prevents or diminishes striping and helps to provide a more integral image.

The invention is based on the idea of providing, in connection with an in-coupling diffractive optical element of a waveguide, a ray multiplier element that is capable of splitting incoming rays into a plurality of parallel rays that propagate in the waveguide displaced from each other. The multiplier can be designed such at least one ray, preferably a plurality of rays, exit to the pupil of the viewer, at all angles of incidence, whereby striping is prevented. The ray multiplier element can be adapted to split the incoming ray in one or two dimensions.

In particular, the invention is characterized by what is stated in the independent claims.

According to a first aspect, the invention provides a diffractive waveguide element for a personal display device, the element comprising a display waveguide extending in a waveguide plane, an in-coupling diffractive optical element arranged onto or into the display waveguide for diffractively coupling light rays into the display waveguide, and an out-coupling diffractive optical element arranged onto or into the display waveguide for coupling the diffractively coupled light rays out of the display waveguide. In addition, there is provided a ray multiplier element optically upstream of the out-coupling diffractive optical element, the ray multiplier element being capable of splitting a light ray incoming to the in-coupling grating into a plurality of parallel rays spatially displaced in the waveguide plane before they enter the out-coupling diffractive optical element. The ray multiplier element may be provided either upstream or downstream of the in-coupling diffractive optical element.

In particular, the density of the plurality of parallel rays, i.e. including the original ray and multiplied rays, is higher than the hop length of the incoming light ray in the direction of propagation of the incoming light ray in the display waveguide. This ensures that real ray densification of the light field take place.

According to a second aspect, the invention provides a diffractive waveguide display comprising a diffractive waveguide element of the above kind, and an image projector adapted to project a plurality of laser rays onto said in-coupling diffractive optical element, the rays being spatially multiplied in the ray multiplier element. The initial single beam emitted by the image projector exits as a parallel multi-ray beam from the out-coupling grating.

In particular, the spatial displacement of multiplied rays at each particular angle that takes place in the ray multiplier element is different from the hop length of the rays in the display waveguide, so that additional spatial spreading of the rays takes place. In a typical embodiment, the displacement is smaller than the hop length in the waveguide.

The invention offers significant benefits. The ray multiplier increases the bouncing density of rays propagating in the waveguide and therefore increases the number of out-coupled rays per unit area at the out-coupling grating. This increases the probability or fully ensures that there is at least one ray that exits to the eye pupil of the viewer. Thus, striping is prevented or at least decreased and an integral and more homogeneous (stripe-free) image is seen.

The invention improves the performance of the display in particular with high angles of incidence, which have previously been prone to striping.

It should be noted that the invention differs from conventional exit pupil expander (EPE) gratings such that the density of the plurality of parallel rays is higher than the hop length in the direction of propagation of the incoming light. EPEs according to prior art are incapable of densifying the light field in the original propagation direction, but only in the transverse direction.

The invention can be implemented with relatively simple ray multiplier element with minor or no changes the overall waveguide design. No changes are required in the projector.

The dependent claims are directed to selected embodiments of the invention.

In some embodiments, the ray multiplier element comprises a planar multiplier waveguide having a thickness smaller than said display waveguide. The multiplier waveguide can be positioned such that it directly interacts with the in-coupling diffractive optical element so as to cause the ray multiplication in at least one dimension. Additional grating or micromirror arrangement, for example, can be provided to cause multiplication in the other dimension. In some embodiments, the multiplier waveguide is arranged onto or below the surface of the display waveguide aligned with the in-coupling diffractive optical element. Thus, the multiplication can be achieved without increasing the footprint of the waveguide.

In some embodiments, the ray multiplier element comprises one or more micromirror elements or diffractive gratings adapted to carry out or facilitate the splitting of the incoming light ray.

In some embodiments, the multiplier element is a zone in the display waveguide having two diffractive gratings arranged on opposite surfaces of the display waveguide and on the propagating path of the light diffracted into the waveguide by said in-coupling diffractive optical element. The diffractive gratings, or more generally diffractive optical elements, cause the required displacement for rays hitting them.

In some embodiments, the ray multiplier element is configured to split the light ray only above predefined angle of incidence of the incoming ray. Likewise, the ray multiplier element can be configured to provide at least two different multiplication factors for at least two different angles of incidence of the incoming rays, respectively.

In typical embodiments, the waveguide element is a laser-illuminated element, in which each single ray at having a specific angle of incidence corresponds to a single pixel of the image seen by the user. Thus, the image projector is a laser beam projector, such as a scanning beam projector.

Next, embodiments of the invention and advantages thereof are discussed in more detail with reference to the attached drawings.

DETAILED DESCRIPTION OF EMBODIMENTS

Definitions

Diffractive optical element herein refers to gratings and other optical structures that contain regular or non-regular features having at least one dimension in the order of visible light wavelengths, i.e, typically less than 1 μm, and thus causes significant diffraction of light. Examples include line gratings (one dimensional gratings) and two-dimensional gratings. The gratings can be single-region gratings (with the same microstructure and optical response throughout the grating area) or multi-region gratings (i.e. containing zones having different microstructures and optical responses).

"Hop length" is the distance between two successive bouncing points of light propagating in a waveguide via total internal reflections on the same surface of the waveguide.

Description of Selected Embodiments

Beam multipliers herein discussed are needed for example when augmented reality (AR) waveguides are illuminated by laser light. For the image produced by such a waveguide to appear uninterrupted to the observer's eye, it is necessary that at least one laser beam corresponding to each FOV angle illuminates the eye pupil at all times. Usually, the pupil of the human eye has a diameter exceeding 2 mm, which means that the beams should be separated by no more than this distance from each other at the out-coupling region to ensure an uninterrupted image in all situations. However, in normal waveguide structures the inter-beam distances after exit pupil expansion may be as large as 5 mm, and thus the beams must be subdivided additionally (to the EPE function). This additional subdivision is the purpose of the present ray multiplier.

Figure 1A:
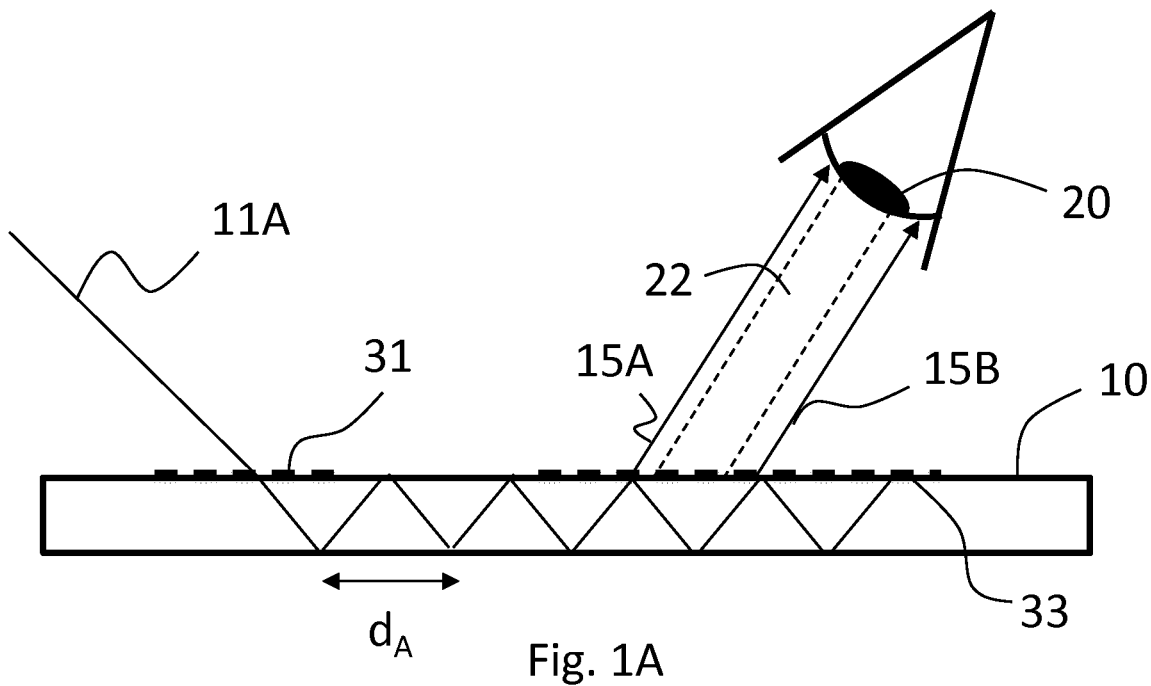
FIGS. 1A and 1B show cross-sectional side views of a conventional waveguide with incoming rays that do not exit and do exit to the pupil of the viewer, respectively.

To first illustrate the problem underlying the invention, FIG. 1A shows a planar waveguide 10 having an in-coupling grating 31 and an out-coupling grating 33. In incident ray 11A is diffracted by the in-coupling grating 31 into the waveguide 10, where it propagates via total internal reflections. The angle of incidence of the incoming ray 11A is relatively high with respect to the normal of the waveguide, whereby also the diffraction angle is high and hop length (bouncing period) $d_A$ is long. Because of the long period, the rays 15A, 15B exiting the waveguide at the region of the out-coupling grating 33 miss the pupil 20 of the viewer's eye. In order for a ray at a specific angle to be seen, it should exit within the zone of sight 22 for that angle.

Figure 1B:
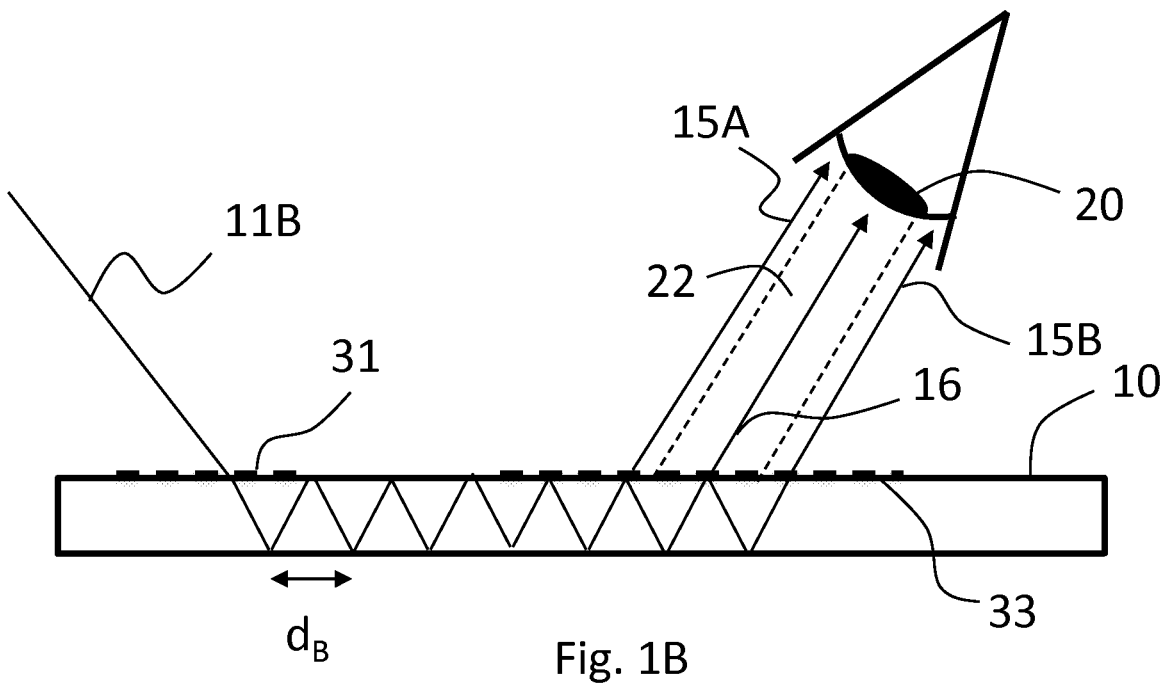

FIG. 1B shows a modified situation, where the angle of incidence of the incoming ray 11B is lower, making also the diffraction angle lower and hop length $d_B$ shorter. Now, one exiting ray 16 meets the pupil 20. Even if the eye is moved, at least one of the exiting rays 15A, 16, 15B will always meet the pupil 20.

Generally speaking, the present beam multiplier element may be a component separate from the main waveguide of the display element or it may be integrated as part of the waveguide functionality. It can be realized using a combination of gratings and/or controlling the waveguide thickness. Non-limiting examples are discussed below.

In some embodiments, the beam multiplier element is provided upstream of the in-coupling grating taking advantage of an additional waveguide having a thickness smaller than the thickness of the main display waveguide.

Figure 2A:
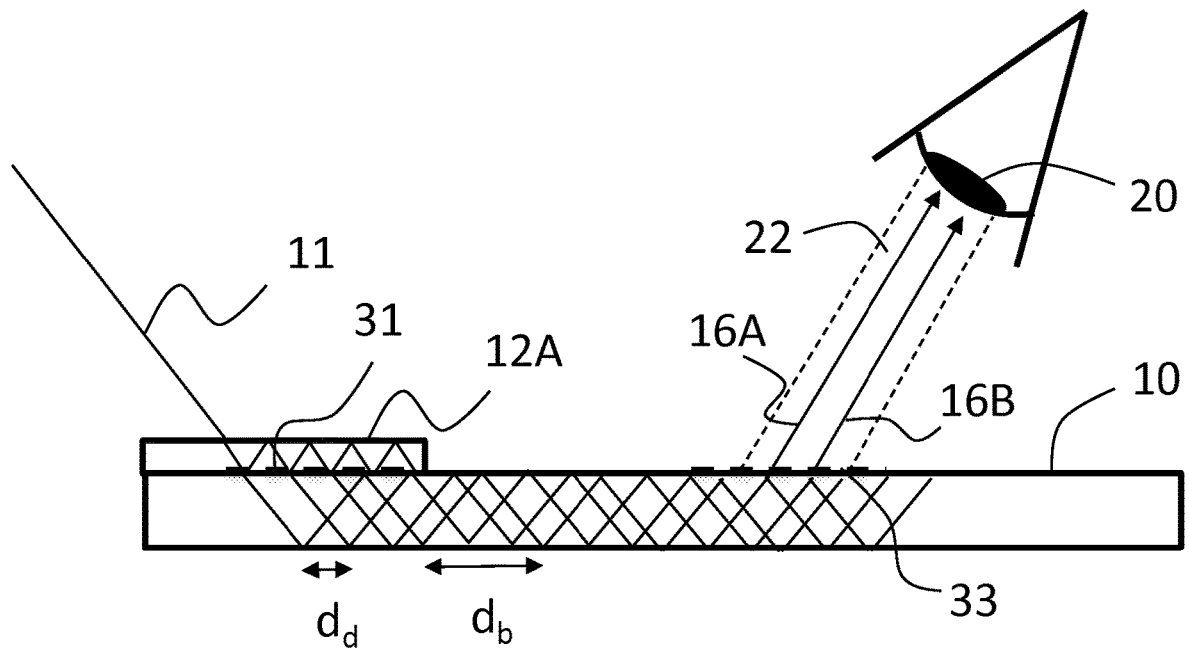
FIGS. 2A-C show cross-sectional side waveguides with three different kinds of ray multiplier elements according to embodiments of the present invention.

In accordance with this, FIG. 2A shows an embodiment, where a ray multiplier element 12A is provided on the waveguide 10. The element 12A herein comprises a multiplier waveguide which is thinner and smaller in area than the main waveguide 10. The in-coupling grating is located downstream of the multiplier element between the multiplier waveguide and the display waveguide 10. The incident ray 11 bounces inside the multiplier waveguide with a short bounce period, and at every bounce at the in-coupling grating 31, part of the light is diffracted into the display waveguide 10. Thus, the ray is multiplied and at least one, herein two, rays 16A, 16B exit to the eye pupil 20.

Figure 2B:
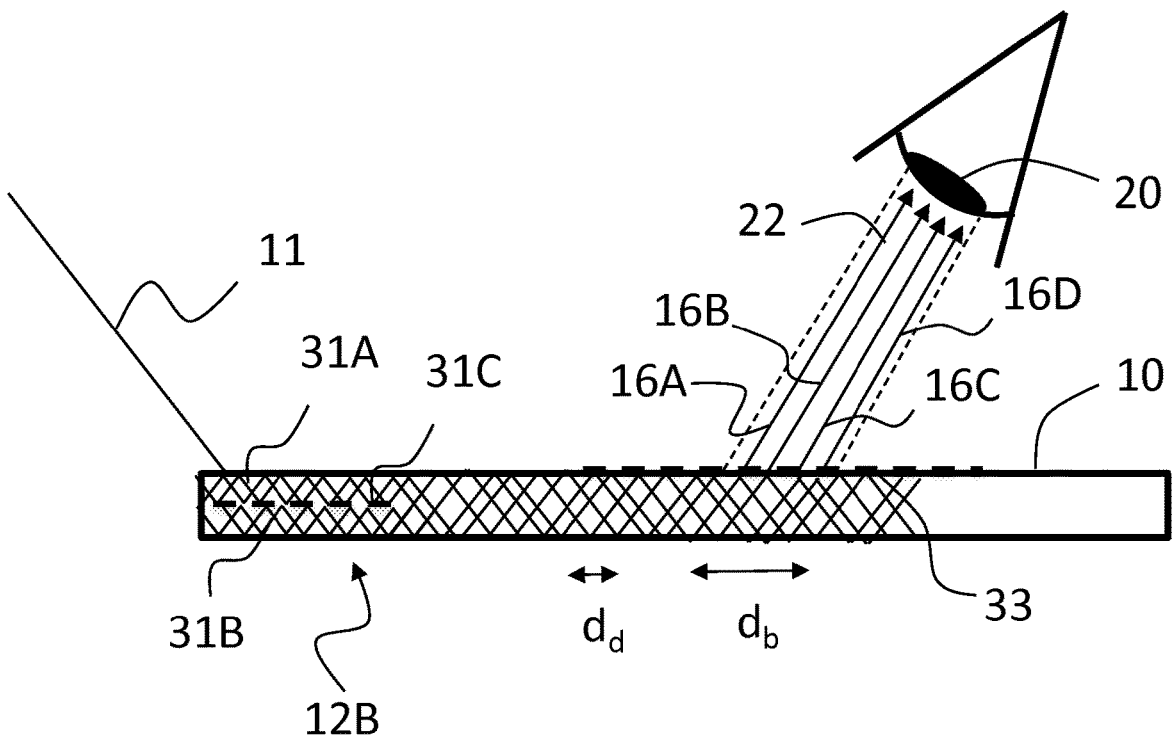

FIG. 2B shows an embodiment, where the ray multiplier element 12B is formed by two thin multiplication/multiplier waveguides 31A, 31B and an intermediate DOE 31C therebetween. When incident light 11 enters the multiplier element 12B, the thin portions interact so that the amount of rays is multiplied when they escape into the main waveguide 10 for propagation therein towards the out-coupling grating 33. In this example, four rays 16A-D hit the pupil 20 of the eye.

In some embodiments, there are provided two or more thin layers having different thicknesses. In further embodiments, there is provided a zero-order grating (grating having only zeroth diffraction orders) between at least one pair of the layers.

In some embodiments, light propagates in the stacked thin layers into different directions, which also provides an efficient beam multiplier configuration.

Figure 2C:
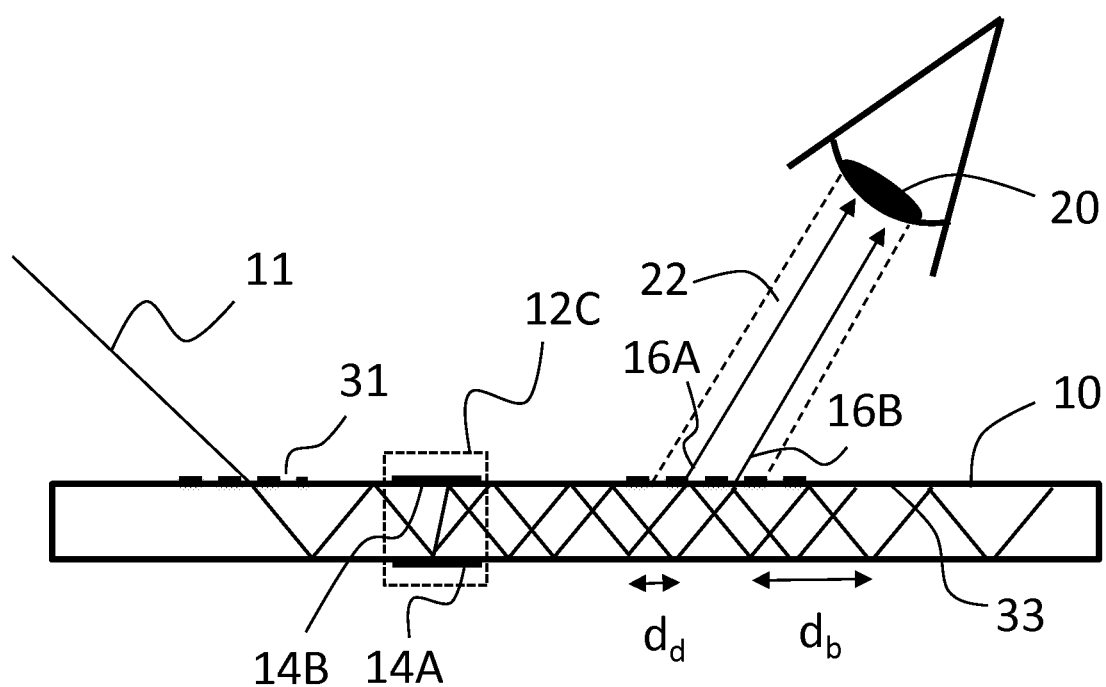

FIG. 2C shows an embodiment, where the ray multiplier element 12C comprises two multiplier gratings 14A, 14B arranged on opposite surfaces of the display waveguide 10. The gratings are adapted to diffract the rays into lower angle, again with the result that one or more beams 16A, 16B exit to the eye pupil 20. When the initial in-coupled ray hits the first multiplier grating 14A on a first side (here the bottom side) of the waveguide 10, a first part of it continues "normally" via total internal reflection and second part of it is directed by reflective diffraction towards the second multiplier grating 14A on the second side (here the upper side) of the waveguide 10. From that point, the second ray is again reflectively diffracted and continues in the same propagation angle as the first ray but displaced therefrom. Thus, both rays "fit" into the eye pupil pipe of sight 22.

In one embodiment, the multiplier gratings 14A, 14B are similar to each other, i.e., have the same grating periods and orientations (or more generally grating vectors).

In the example of FIG. 2C, the multiplication factor is two, but by extending the width of the ray multiplier element 12C, i.e. the multiplier gratings 14A, 14B therein, a multiplication factor of more than two can be achieved.

In the example of FIG. 2C, ray multiplication in one dimension only is shown for simplicity. However, by using multi-region grating and/or two-dimensionally periodic gratings, multiplication in two dimensions can be achieved.

In one embodiment, the multiplier gratings 14A, 14B are replaced with some optical element carrying out essentially the same optical function. For example, with a partially transmissive mirror arrangement, the same angle-maintaining beam-splitting effect can be achieved.

In some embodiments, the multiplier element is provided as a thin waveguide layer on top the thicker main waveguide layer at the region of the out-coupling grating. As light leaks from the main waveguide into the thin waveguide, its hop length shortens. The shorter hop length shortens the distance of exiting rays that are coupled out by the out-coupling grating/DOE that sits on top of the thin layer.

There may also be provided a cascade of similar or different kinds of ray multiplier elements to increase the multiplication factor.

In typical embodiments, the multiplier element is capable of providing a multiplication factor of at least 4, in particular at least 9, such as 4-100, for high incident angle beams, that is, beams at the FOV limit angles of the display element. In particular, the multiplication element may be configured to provide at least 9 beams per pupil area having a diameter of 2 mm for all angles within the FOV of the display device.

Figure 3:
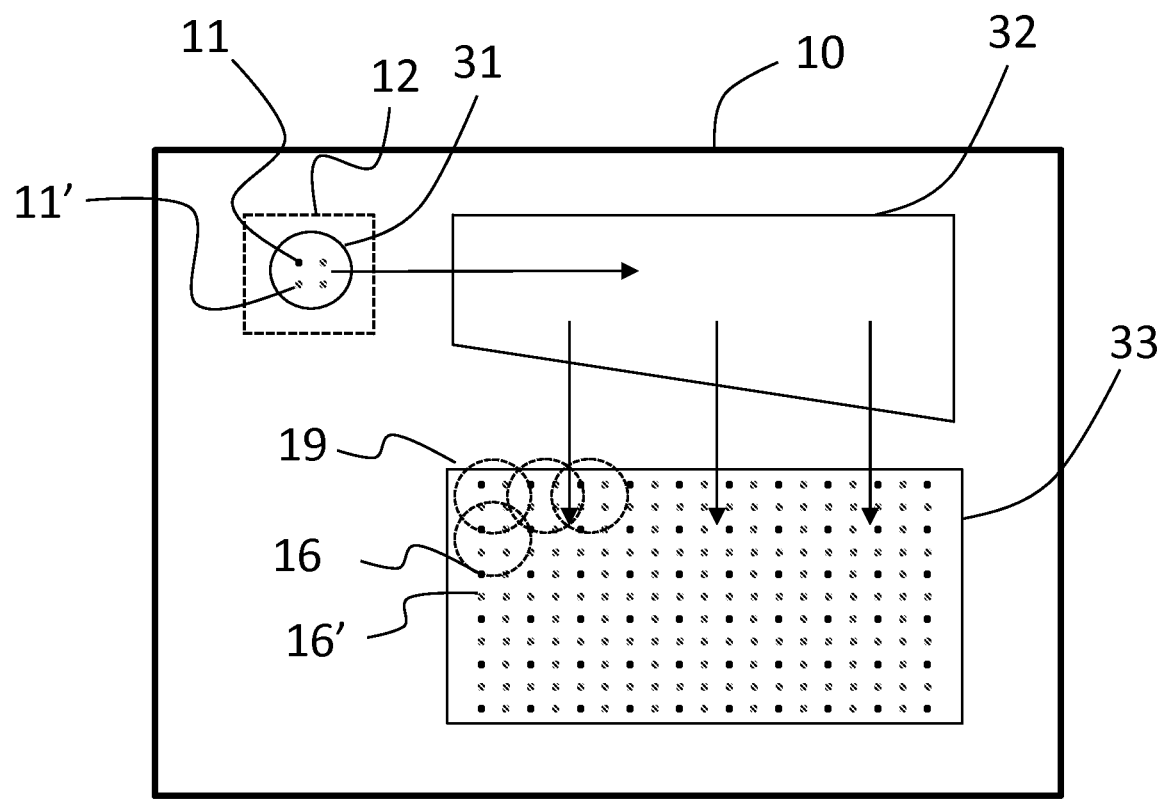
FIG. 3 shows a top view of a waveguide according to one embodiment of the invention.

FIG. 3 illustrates the invention as a top view of the waveguide 10. Here the ray multiplier element 12 is aligned with the in-coupling grating 31 in order to replicate the original beam 11 into additional beams 11' displaced in two dimensions and propagating into the same direction. The beams 11, 11' travel to an exit pupil expander (EPE) grating 32, to increase the exit pupil in one or two dimensions. From the EPE grating 32, the rays continue towards the out-coupling grating 33, from which the out-coupled beams 16, 16', corresponding to the original and replicated beams 11, 11' and extended across the whole out-coupling grating 33, exit parallel to each other. Thus, the integrity, i.e. relative pixel positions, of the image is maintained and the homogeneity of the image improved. The dashed circles 19 illustrate the original pupil size, i.e. herein the area of the in-coupling grating 31, which is replicated several times on the out-coupling grating 33.

In this example, the illustrated multiplication factor is 2×2, i.e., 4, but other symmetric or non-symmetric multiplication factors can be implemented as well, as understood from the above-described examples.

For clarity, the illustrated examples show the ray-multiplication effect for one angle of incidence only. The same effect is, however, seen at a wider range of angles that meet the in-coupling grating and the ray multiplier element. By positioning of the ray multiplier element suitably with respect to the image projector and dimensioning thereof, the angle range can be controlled and even different multiplication factors provided for different angles.

In some embodiments, the multiplication factor for at least some high angles of incidence is configured to be higher than the multiplication factor for at least some low angles of incidence (for which the hop length is inherently shorter and the problem less relevant).

Embodiments of the invention can be utilized in various personal display devices, augmented reality (AR), virtual reality (VR) and mixed reality (MR) devices, like near-to-the-eye displays (NEDs) and other head-mounted displays (HMDs), as well as head-up displays (HUDs), in their different forms.

Even though not discussed here in detail, the waveguide or individual layers thereof may comprise, in addition to the in-coupling, exit pupil expander and out-coupling gratings, also other diffractive optical elements, such as beam redirection gratings.

The invention claimed is:

1. A diffractive waveguide element for a personal display device, the element comprising:
   a display waveguide extending in a waveguide plane,
   an in-coupling diffractive optical element arranged onto or into the display waveguide for diffractively coupling light rays into the display waveguide, the coupled light rays propagating in the display waveguide with a propagation hop length,
   an out-coupling diffractive optical element arranged onto or into the display waveguide for coupling the diffractively coupled light rays out of the display waveguide into an eye pupil pipe, and
   a ray multiplier element upstream of the out-coupling diffractive optical element,
      the ray multiplier element being capable of splitting a light ray incoming to the in-coupling diffractive optical element into a plurality of parallel rays spatially displaced in the waveguide plane in at least one dimension thereof,
      the ray multiplier element being capable of diffracting rays into a lower angle to increase density of the diffracted rays,
      the ray multiplier element includes at least one diffractive grating adapted to carry out or facilitate said splitting of the incoming light ray,
      the ray multiplier element is a zone in said display waveguide having two diffractive gratings arranged on opposite surfaces of the display waveguide and on the propagating path of the light diffracted into the waveguide by said in-coupling diffractive optical element, and
      the density of the plurality of parallel rays in the direction of propagation of the incoming light being higher than said hop length.

2. The element according to claim 1, wherein the ray multiplier element is positioned downstream of the in-coupling diffractive optical element.

3. The element according to claim 2, wherein the ray multiplier element is adapted to multiply an incoming ray into at least two displaced beams within said hop length.

4. The element according to claim 1, wherein the ray multiplier element is adapted to multiply an incoming ray into at least two displaced beams within said hop length.

5. The element according to claim 1, wherein the ray multiplier element comprises a plurality of mirror elements adapted to carry out or facilitate said splitting of the incoming light ray.

6. The element according to claim 1, wherein the ray multiplier element is adapted to split each ray incoming to the in-coupling diffractive optical element into a plurality of parallel rays in two dimensions.

7. The element according to claim 1, wherein the ray multiplier element is configured to split the light ray only above a predefined angle of incidence of the incoming ray.

8. The element according to claim 1, wherein the ray multiplier element is configured to provide at least two different multiplication factors for at least two different angles of incidence of the incoming rays, respectively.

9. A diffractive waveguide display comprising:
   a diffractive waveguide element according to claim 1, and
   an image projector adapted to project a plurality of laser rays onto said in-coupling diffractive optical element, the rays being spatially multiplied in said ray multiplier element.

10. The display according to claim 9, wherein the image projector is a laser projector.

11. A diffractive waveguide display according to claim 10, wherein the laser projector comprises a microelectromechanical mirror for providing said plurality of rays at different angles onto said in-coupling diffractive optical element.

* * * * *